Nov. 19, 1968  T. J. TVEDT  3,411,604
REMOTE SWITCHING CIRCUIT FOR SEISMOMETERS
Filed July 21, 1967
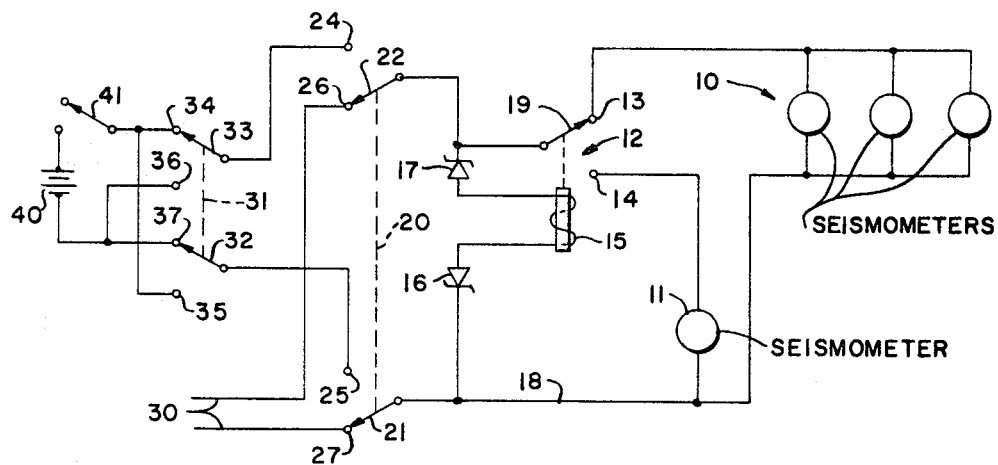
INVENTOR:
T. J. TVEDT
BY: Theodore E. Bieber
HIS ATTORNEY

United States Patent Office 3,411,604
Patented Nov. 19, 1968

3,411,604
REMOTE SWITCHING CIRCUIT FOR
SEISMOMETERS
Thorwald J. Tvedt, Houston, Tex., assignor to Shell Oil
Company, New York, N.Y., a corporation of Delaware
Filed July 21, 1967, Ser. No. 655,066
3 Claims. (Cl. 181—.5)

ABSTRACT OF THE DISCLOSURE

A switching circuit for coupling either a single seismometer or a plurality of seismometers to a recording system. The switching circuit uses a polarized relay for switching and Zener diodes to isolate the relay from the seismometers so that the relay coil does not load the seismometers.

Background of the invention

In seismic exploration it is customary to create seismic disturbances with the resulting seismic waves being propagated from a point through the earth in all directions. Conventionally, an explosive charge is set off to create the seismic waves, although other means involving dropping weights, gas explosions, spark explosions, etc., have also been used. Some of the seismic waves travel along near the surface of the earth without penetrating downwardly, while other waves penetrate downwardly and are reflected and refracted from interfaces having different wave-transmitting characteristics. The reflected and refracted waves return to the surface of the earth in the vicinity of the original seismic disturbance. Both waves that travel near the surface, as well as the diffracted and reflected waves, are detected by means of seismometers which convert the received waves to related electrical signals. The related electrical signals are then recorded by various means, such as FM recording or digital recording.

In reflection seismic work it is necessary to record and study the so-called direct wave. The direct wave is the wave that travels directly from the source of seismic disturbance to the seismometers without penetrating any great distance into the earth. It is necessary to record the direct wave to make corrections for the characteristics of the weathered layer of rock just below the earth's surface. The weathered layer may vary in thickness from near zero to many feet to hundreds of feet, and its transmitting characteristics are markedly different from those of the underlying strata. Thus, its effect on the waves reflected up from the deep strata must be measured and compensation for.

Normally, it has been the practice to record the direct wave from a single seismometer and then record the returning reflected and refracted waves from a plurality of seismometers that are disposed in a particular pattern. This requires the switching on of a single seismometer and then the subsequent switching on of the remaining seismometers during the time interval following the seismic explosion.

In Patent No. 2,260,217 there is disclosed a switching system for switching on the single seismometer and then subsequently connecting the remaining seismometers during the time interval following the disturbance. The system requires accurate timing and further requires that the seismic signals be transmitted through the relatively high impedance switch contacts. The system also discloses the use of a complicated polarized relay for effecting the desired switching actions.

It has also been proposed to use high-impedance relays for accomplishing the switching with the relays being remotely controlled. This results in the high impedance of the relay coil being included as part of the load on the seismometers and thus materially reduces the amplitude of the recorded signal.

Brief description of the invention

The present invention solves the above problems by providing a polarized relay for coupling a single seismometer to the recording circuits to record the direct wave and then coupling a plurality of seismometers to the recording circuit. Normally, the invention utilizes two separate seismic disturbances, one disturbance being used for recording the direct arriving waves and the other disturbance being used for recording the reflected and refracted waves. A polarized relay is used to switch the various seismometers and is isolated from the seismometers by means of Zener diodes. Thus, the relay coil is not a load on the seismometers and the seismometer signal can be easily recorded.

Brief description of the drawing

The above advantages and other features of this invention will be more easily understood from the following detailed description of a preferred embodiment when taken in conjunction with the attached drawing showing a schematic arrangement of a switching circuit constructed according to this invention.

Description of preferred embodiments

Referring now to the drawing there is shown a schematic switching arrangement for accomplishing the purpose of this invention wherein a single seismometer 11 is coupled to the recording system to record the direct wave and a plurality of seismometers 10 are coupled to the recording system to record the reflected and refracted seismic signals. The plurality of seismometers 10 are connected in a parallel arrangement with one common lead being connected to one contact 13 on the polarized relay 12 and the other lead being connected to common lead 18. The single seismometer 11 is connected to the other stationary contact 14 to the polarized relay and the common lead.

Two Zener diodes 16 and 17 are disposed in a back-to-back arrangement and coupled in series with the coil 15 of the polarized relay. The Zener diodes are disposed between the movable contact 19 of the polarized relay and the common lead. The movable switch contact of the polarized relay is coupled to the movable contact 22 of a selection 20, while the lead 18 is coupled to the movable contact 21 of the selection switch. The movable contacts 21 and 22 are ganged together by means of a mecahnical connection so that they will move in unison. The stationary contacts 26 and 27 of the selection switch are coupled to a pair of leads 30 which couple the seismometers to a recording system not shown in the attached drawing. The stationary contacts 24 and 25 of the selection switch are coupled to the movable switch arms 32 and 33 of a pair of switches that form the polarization switch 31. The switch arms 32 and 33 are coupled together by means of a mechanical connection so that they will move in unison. The stationary contacts 34 and 35 of the polarization switch are coupled through a switch 41 to the positive side of a battery 40, while the stationary switch contacts 36 and 37 of the polarization switch are coupled to the negative side of the battery 40.

In a particularly preferred arrangement, Zener diodes 16 and 17 with low breakdown voltage characteristics are used in conjunction with a low impedance, low voltage relay coil 15. Such an arrangement will minimize greatly the voltage requirement of the power source needed to operate the relay and result in reduction of the current which flows through the seismometers at the moment of switching. In addition, power line interference, due to voltages induced in the relay coil when in the proximity of power lines, will be greatly reduced because of the high reverse impedance offered by the Zener diodes to currents produced by such voltages. Also, a low impedance relay coil will produce less interference than a high impedance coil when operated near power lines.

*Operation*

As shown in the drawing the polarized relay is positioned to couple the plurality of seismometers 10 to the recording circuit. When it is desired to record the signal from the single seismometer 11, the selection switch is moved to its alternate position with the movable contact 21 in contact with stationary contact 25 and movable contact 22 in contact with stationary contact 24. The polarizing switch is positioned as shown in the drawing. This will apply a back-bias to the diode 17 causing it to breakdown and permitting current to flow through the polarized relay coil 15. When the relay coil is energized, it will move the movable arm into contact with the stationary contact 14. After the relay contacts are shifted, the selection switch 20 is moved to connect the single seismometer 11 to the recording system and a signal from the seismometer 11 is recorded.

After the signal from the single seismometer is recorded, the selection switch is repositioned to connect the relay coil to the polarization switch. The polarization switch is then moved to its alternate position from that shown and the switch 41 again closed. This will apply a positive voltage to the diode 16 that will back-bias the diode and cause it to break down permitting current to flow through the relay coil 15 in the opposite direction. This will cause the movable contact to shift into contact with the stationary contact 13 and connect the plurality of seismometers to the selection switch. The selection switch can then be moved to the position shown to couple the seismometers to the recording system.

I claim as my invention:
1. A switch circuit for selectively coupling a single seismometer or a plurality of seismometers to a recording system, said switch circuit comprising:
 a polarized relay having a coil, a single movable and two stationary contacts, one of said stationary contacts being coupled to the single seismometer and the other stationary contact being coupled to the plurality of seismometers;
 a pair of Zener diodes, said Zener diodes being coupled to opposite ends of said coil in a back-to-back arrangement;
 a first switch means, said first switch means being coupled to the movable contact of said polarized relay to couple said seismometers to a recording circuit and a polarization circuit; and
 a polarization circuit comprising a source of direct current potential and a polarization switch means, said polarization switch means being coupled to said pair of Zener diodes to control the direction of current flow through said relay coil.
2. The circuit of claim 1 wherein said Zener diodes have a breakdown voltage that exceeds the normal voltage signal generated by said seismometers and therefore isolates the said seismometers from said relay coil.
3. The circuit of claim 1 wherein said relay has a relatively low impedance, low voltage relay coil, whereby the amount of relay-operating current or relay coil-produced current that may flow through the seismometers is minimized.

References Cited

UNITED STATES PATENTS 2,260,217  10/1941  Eckhardt et al. _____ 181—.5

BENJAMIN A. BORCHELT, *Primary Examiner.*

T. H. WEBB, *Assistant Examiner.*